United States Patent Office 3,012,143
Patented Dec. 5, 1961

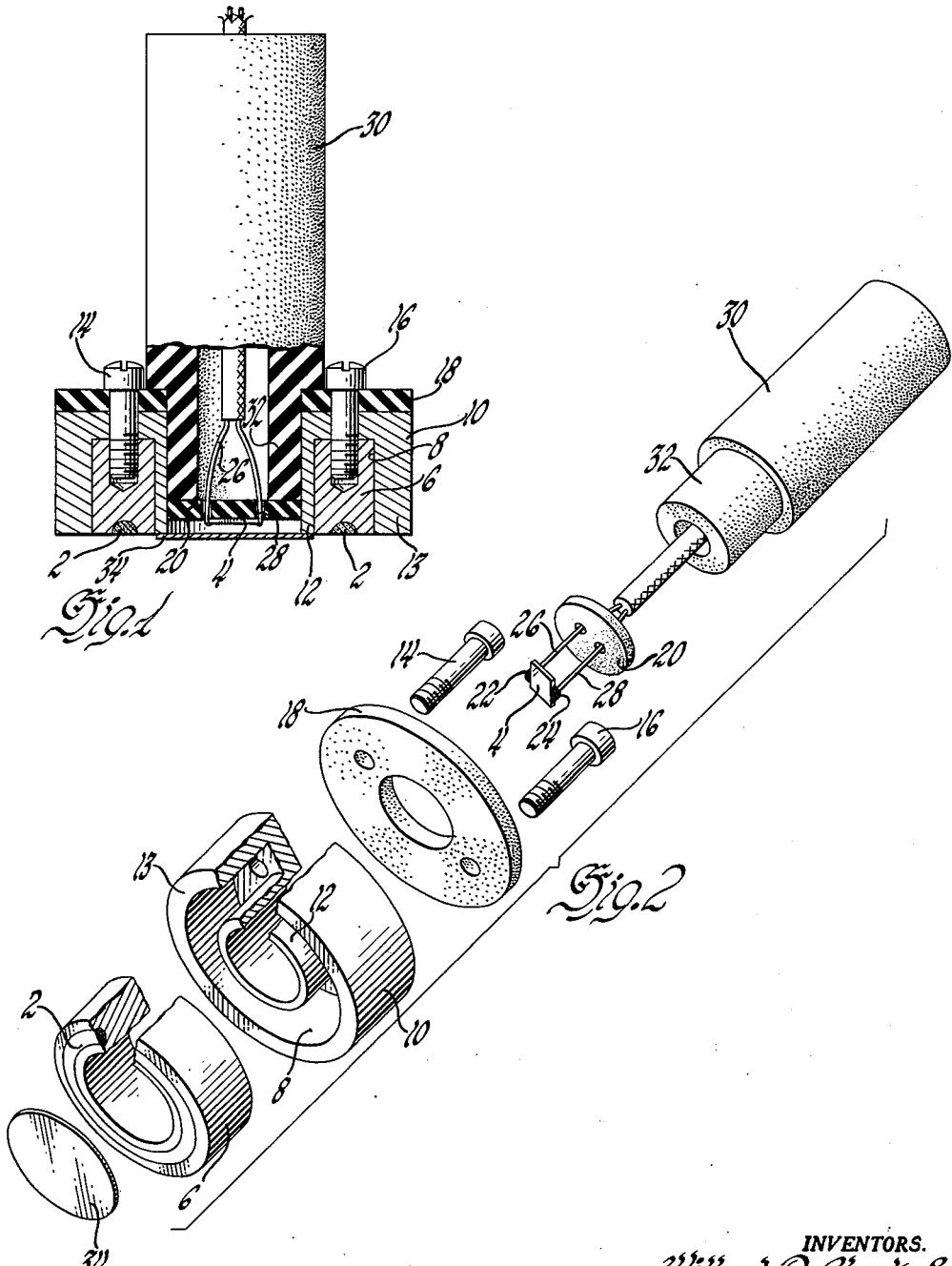

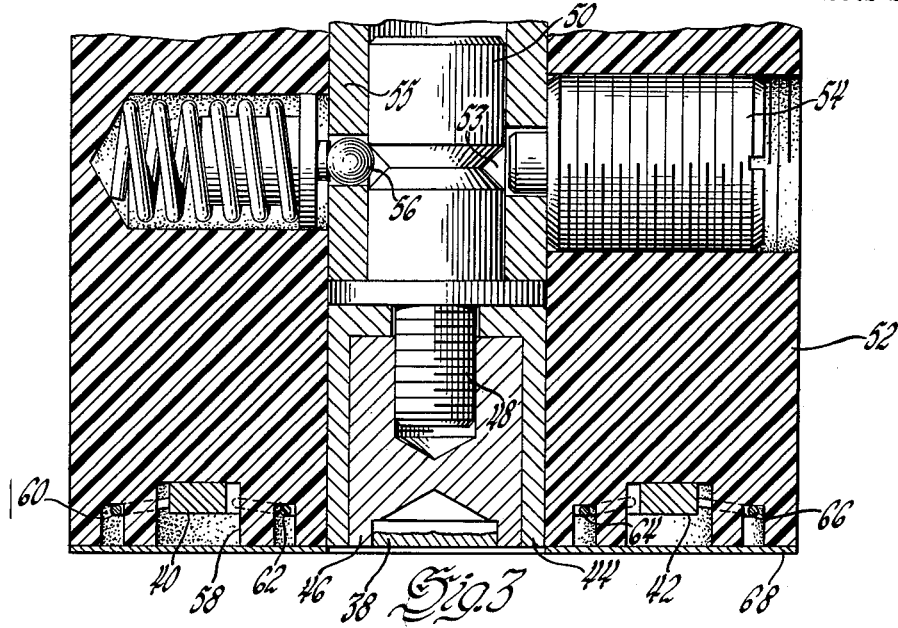
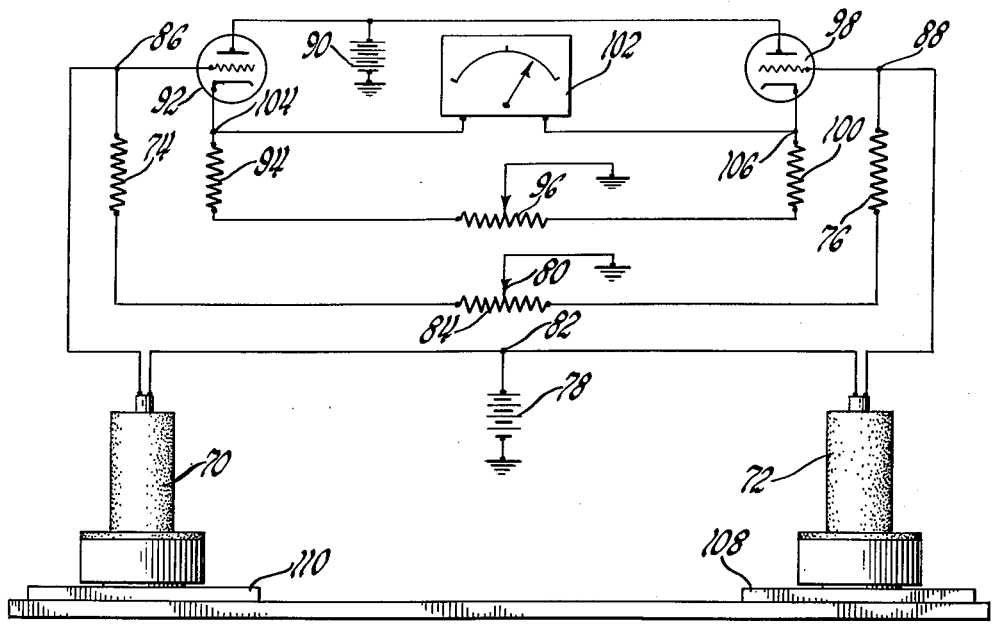

3,012,143
TESTING AND MEASURING DEVICE
Willard D. Cheek, Warren, and Alexander Somerville, Birmingham, Mich., assignors to General Motors Corporation, Detroit, Mich., a corporation of Delaware
Filed Nov. 13, 1956, Ser. No. 621,809
3 Claims. (Cl. 250—83.3)

This invention relates to measuring or testing devices of the type whereby the body or material to be tested is subjected to radiation as from a radioactive source and the effect of the body upon such radiation is measured. Heretofore, devices of this general type have found only very limited application, chiefly because of the relative complexity, cost, fragility and size of the measuring systems or devices employed.

In accordance with the present invention, radiation type measuring and testing devices are provided which are of relatively simple, rugged and compact construction and which are adapted to a great variety of uses for making tests and measurements in production operations and as meters, gauges or indicators in production or other apparatus as well as in automobiles, aircraft and the like. Embodiments of the invention may be used for measuring or testing thickness, density, porosity or any other physical or chemical characteristic of a body or material which influences its transmission, reflection or absorption of radiation as from a radioactive source.

One of the important features of the devices of the present invention is the incorporation of a radiation-sensitive semi-conductor as a means for detecting the effect of the body or material being tested on the radiation, i.e., the amount of radiation transmitted, reflected or absorbed by the body or material. There is attained a considerable simplification of the devices and a very substantial reduction in the size of the devices so that they can be conveniently used for measurements on small areas and in small spaces. Also, because of its relatively small size, the semi-conductor may be positioned very closely adjacent to the radiation source material. Another of the important features of embodiments of the present invention is the location of the radiation-detecting means in close proximity to the radioactive source material in a single compact fixture.

By the term "radiation-sensitive semi-conductor" is meant a semi-conductor or resistor which undergoes a change in electrical conductivity or resistivity proportionate to the amount of radiation to which it is exposed, thus serving as a radiation indicator. Such semi-conductor may, for example, be in the form of a crystal or crystals, or in the form of a film or a sintered mass of crystals. Examples are zinc telluride, magnesium sulfide, cadmium telluride, silver sulfide, zinc sulfide, calcium selenide, cadmium selenide, and cadmium sulfide crystals. Of these a cadmium sulfide is the preferred semi-conductor. It is well known that a cadmium sulfide crystal is gamma ray and alpha ray sensitive and it has now been found that cadmium sulfide is additionally beta ray sensitive. We have found that beta radiation in combination with a cadmium sulfide crystal as the detector is particularly advantageous in a measuring or testing device.

The various other advantages of these and other important features of our invention will appear more clearly in the following description of preferred embodiments and from the drawings in which:

FIGURE 1 is a side view in partial section of a measuring device embodying the invention;

FIGURE 2 is an exploded view of the device shown in FIGURE 1;

FIGURE 3 is a partial side view in section of another embodiment of the invention; and FIGURE 4 is a diagrammatic view of the preferred electrical circuit of the invention.

Referring now to the embodiment of the invention shown in FIGURES 1 and 2, radioactive material 2 is in the form of a ring which encircles the radiation-sensitive semi-conductor 4 which, in the embodiment shown is a crystal of cadmium sulfide. The radioactive material 2 should preferably be protected against loss by rub-off by a suitable covering over its external surface in the form of a plastic film or shield which is transparent to the radiation emitted. The choice of radiation-sensitive semi-conductor will primarily depend upon the type of radioactive material used. As stated previously, cadmium sulfide crystal is the preferred semi-conductor, particularly where beta radiation is employed. The radioactive material may be any suitable source of alpha or beta particles or gamma or other electromagnetic radiation capable of penetrating the body or material to be tested. Examples are phosphorous-32, strontium-90, polonium-210, thallium-204, chlorine-36, hydrogen-3, cobalt-60, iron-59, cesium-134, uranium-233, plutonium-239, and carbon-14. There are numerous others. Beta ray emitters, such for example as strontium 90 and phosphorous 32 are preferred. It is understood, of course, that the radioactive material may be in the form of a chemical compound of the radioactive isotope. Phosphorous-32, for example, may be conveniently used in the form of its compound phosphoric acid or a salt thereof.

The ring of radioactive material is imbedded in a groove provided in the face of an annular block 6, made of aluminum, which block in turn is positioned within a recess 8 of a second annular block 10, made of lead. Inner wall 12 of the lead block serves as a radiation shield positioned between the radiation source 2 and the cadmium sulfide crystal 4 thereby preventing the passage of radiation directly to the crystal. Particularly with respect to high energy radiation such as beta particles, the aluminum block 6 also serves as an important part of the radiation shield. That is, the aluminum slows down the high energy particles so that they are absorbed by the lead wall 12 without the emission of breaking radiation (bremsstrahlung) such as X-rays which would affect the semi-conductor 4. In all instances it is essential that the shield between the radioactive material 2 and the semi-conductor 4 be sufficient to prevent passage of radiation directly to the semi-conductor without the emission of breaking radiation which would affect the semi-conductor, and the exact choice of shield material will, of course, be dictated by the type radioactive material used.

Blocks 6 and 10 are secured together by means of threaded members 14 and 16 which extend through a ring-shaped plate 18. The cadmium sulfide crystal 4 is secured as by cement to an insulator disc 20, which disc is cemented to the face of cylindrical shaped support member 30 having its end portion 32 of reduced diameter to fit through the opening in plate 18 and into the bore of annular block 10 so that the crystal 4 is positioned closely adjacent and within the ring of radioactive material 2, radiation shield 12 being interposed therebetween. An opaque light shield 34 in the form of a disc of aluminum, stainless steel, beryllium or the like is fixedly positioned, as by cement, over the front of disc 20 to prevent light from reaching the cadmium sulfide crystal 4. The light shield is important when the radiation-sensitive semi-conductor used has a relatively high sensitivity to light. Besides serving as a light shield, disc 34 serves as a means to maintain the radioactive material 2 out of contact with any surface being measured, against which the fixture is placed, thus preventing damage to the radioactive material.

A pair of electrical contacts 22 and 24 are secured at spaced points to the cadmium sulfide crystal, wire conductors 26 and 28 being electrically connected to these contacts to thereby allow passage of electrical current through the crystal. Good electrical contacts with the cadmium sulfide crystal may be made in accordance with known practice by first coating the crystal with a metal such as indium, gallium, gold or the like at the points where the contacts are desired and then making the electrical connections to the coatings as by solder. For highest sensitivity, the contacts should be located such that the radiation strikes the semi-conductor adjacent the negative contact. One contact can advantageously be located on the surface of the semi-conductor which receives the radiation and the other contact on the oppositely disposed surface.

The above-described assembly of the supporting structure of the fixture for the radioactive material and the radiation-sensitive semi-conductor is particularly advantageous because of the ease with which radioactive material may be removed and replaced, it only being necessary to disengage threaded members 14 and 16, withdraw the annular block 8 and replace it with another such block having a fresh source of radioactive material.

A detailed description of the operation of the device, particularly with reference to the preferred type of electrical circuit, follows hereinafter; however, the following brief description of operation will serve to a better understanding of the above-described structure and its function. Where the device is used, for example, to measure the thickness of metal sheet stock, the fixture shown in FIGURE 1 is positioned with the radioactive material 2 and semi-conductor 4 facing the sheet stock, and electric current is passed through the semi-conductor 4. Rays from the ring 2 of radioactive material are projected into the sheet stock, some passing on through, some being absorbed, and some being reflected or backscattered after partial passage. A portion of the prays are backscattered or reflected back to the cadmium sulfide crystal 4 thereby changing its conductivity which change is indicated by a suitable meter in the electrical circuit. The number of rays backscattered by the sheet stock to the crystal 4 is a function of the thickness of the sheet stock. Thus an accurate measurement of the thickness may be obtained. It is, of course, necessary that the instrument be previously accurately calibrated or, preferably, that the circuit used be of the bridge type to include the test device along with a standard or calibrated device, all as will be more fully described hereinafter. The essential components for any circuit for the device are, of course, a source of electrical energy to cause an electrical current to pass through the semi-conductor and means to measure the changes in conductivity of the semi-conductor. A.C. current is preferable to D.C. chiefly because it provides greater sensitivity. Also, A.C. current is usually more readily available and is more easily amplified in the instance that it is desired to use amplification means in the circuit.

While in the embodiment shown the radioactive material is positioned close to the face of the fixture, it can be recessed further back and likewise, the semi-conductor may be recessed further back, or positioned closer to the face of the fixture, all for the purpose of obtaining optimum reflection of radiation for greatest sensitivity. In this connection, it may be desirable to utilize structure which allows for easy adjustment of the distances the radioactive material and semi-conductor are recessed into the fixture and are distanced apart, particularly where a single device is designed for use in making a number of different types of tests and measurements rather than for making only one particular type of test.

The embodiment shown in FIGURE 3 differs from that shown in FIGURE 1 principally in that the positions of the radioactive material and the radiation-sensitive semi-conductor are reversed on the supporting fixture. In this embodiment, the radioactive material 38, preferably coated or covered with a radiation-transparent film or the like to protect against rub-off, is positioned in the center and is surrounded by the radiation-sensitive semi-conductor. In the embodiment shown, the semi-conductor is in the form of a generally ring-shaped series of cadmium sulfide crystals, two of which are shown at 40 and 42. If desired, a single generally ring-shaped crystal could be used, or a similarly shaped film or sintered crystalline mass of radiation-sensitive semi-conductor. An annular radiation shielding block 44 made of lead is interposed between the radioactive material and the crystals to prevent passage of rays directly to the crystals. Here again, as in the embodiment shown in FIGURE 1, the aluminum of block 46 functions as part of the radiation shield particularly when high energy radiation is used. The radioactive material is contained within a depression formed in cylindrical aluminum block 46 which is retained, by threaded engagement at 48, with a pin member 50. This subassembly is removably secured within cylindrical insulator block 52 by means of an annular groove 53 in pin 50 which is engaged by spring pressed ball 56. Thus, to remove and replace the radioactive source, the assembly of block 46, lead shield 44 and pin 50 may be pulled out against the pressure of the spring pressed ball 56 which rides up and out of groove 53 with a snap action. With this assembly removed, the aluminum block 46 may be unscrewed from the pin 50 and a new aluminum block with a fresh source of radioactive material put in its place. Set screw 54 serves the purpose of retaining within block 52, the sleeve 55 which carries the pin 50.

The cadmium sulfide crystals, two of which are shown at 40 and 42, are positioned in a groove 58 in the face of cylindrical insulator block 52 which may be of a suitable plastic and are electrically connected in parallel or in series by conductor wires, as are shown at 60, 62, 64 and 66, thereby allowing the passage of an electrical current through all of the crystals. In all instances a parallel connection is preferred since with such a circuit the voltage drop across all of the crystals is the same, and in cases where the test or measurement being made is such that the radiation is not symmetrically backscattered, use of a parallel connection is very important for optimum results since with such a connection, rays striking any one of the crystals will actuate the device. In the embodiment shown, five crystals are used but the number of crystals in the annular series can be varied and will, of course, depend upon the size of the crystals used. A ring-shaped aluminum, stainless steel or the like light shield 68 is cemented or otherwise secured to the lower face of block 52 to prevent light from reaching the cadmium sulfide crystals.

The embodiment shown in FIGURE 3 is preferred over that shown in FIGURE 1 chiefly because a greater proportion of the rays backscattered by the material or body being tested impinge on the radiation-sensitive semi-conductor, this by way of the arrangement of the semi-conductors in the form of an annulus surrounding the radioactive source. Thus, with the same size instrument, higher sensitivity and accuracy can be attained.

As was briefly indicated above, it is necessary that the device be accurately calibrated for the exact type of measurement or test it is to perform, or that the circuit in which it is used be a bridge type including a test device and a standard or calibrated device. The latter is preferred, and FIGURE 4 shows an embodiment of such a circuit.

Basically, the circuit shown in FIGURE 4 is a bridge, here of the Wheatstone type, with amplifier and meter means. Connected into two of the conjugate arms of the bridge are devices 70 and 72 and connected into the other pair of conjugate arms are fixed resistors 74 and 76. Devices 70 and 72, for convenience hereinafter referred to as the test and standard transducers, respectively, are constructed in accordance with the invention as hereinbefore described with reference to FIGURES 1 and 2 or FIGURE 3. A high voltage source 78 of either A.C.

or D.C. current, preferably the former, is connected across the junctions 80 and 82 of the pairs of conjugate arms, a potentiometer resistor 84 being connected into the circuit at one of these junctions to permit balance of the bridge. Connected across the other pair of junctions 86 and 88 of the bridge is the amplifier and meter circuit. Thus, the input terminals for the bridge are at junctions 80 and 82 and the output terminals are at 86 and 88.

The amplifier circuit includes a source 90 of A.C. or D.C. current which current passes through a triode amplifier tube 92, fixed resistor 94 and thence through potentiometer resistor 96 to ground. Similarly, on the other side, the current from source 90 flows through triode amplifier tube 98, fixed resistor 100, and then through potentiometer resistor 96 to ground. The grids of amplifier tubes 92 and 98 are tapped into the Wheatstone bridge circuit at 86 and 88, respectively, and a meter 102, either an ammeter or a voltmeter, is connected into the amplifier circuit across 104 and 106. Thus, any voltage difference across points 86 to 88 is amplified and indicated on meter 102.

For purposes of illustration in describing operation of the circuit, assume that the device is used for measuring the thickness of copper sheet stock. Operation would be as follows:

First, the device is calibrated and the circuit balanced. This may be accomplished by placing the standard or calibration transducer 72 and the test transducer 70 against pieces of sheet stock 108 and 110 which are of the same accurately known thickness, energizing the two circuits by way of power sources 78 and 90 and then bringing the indicator needle of meter 102 to the desired position, say center position, by adjustment of potentiometer resistors 84 and/or 96. The use of two potentiometer resistors, one in the Wheatstone bridge circuit and the other in the amplifier circuit, allows for coarse and fine adjustment and/or for a larger scale of adjustment; however if desired, only one potentiometer resistor need be used. The needle position on the dial of the meter is then appropriately marked as desired to meet the need. For example, it could be marked to indicate the thickness of the standard sheet stock or it could be marked zero. With the device so calibrated, the standard sheet stock 110 is removed from under test transducer 70 and transducer 70 placed against the sheet stock of unknown thickness which is to be measured. As previously mentioned, the amount of radiation backscattered by the sheet stock to the radiation-sensitive semiconductor is a function of the thickness of the sheet stock and, thus, the conductivity of the semi-conductor is likewise a function of the thickness of the sheet stock. It will be obvious that the change in voltage across points 86 and 88 as results from the increase or decrease in the conductivity of test transducer 70 is amplified and results in a reading on meter 102 accurately indicating the thickness of the test piece. This reading can be in terms either of the exact thickness of the test piece or in terms of the difference, plus or minus, between its thickness and that of the standard test specimen, this depending upon the type of readings marked on the meter in the calibration.

Various changes and modifications may be made in the circuit all within the full and intended scope of the invention. For example, while the amplifier circuit is advantageous in that it provides greater sensitivity, it may, if desired, be eliminated. As indicated previously, only a single transducer need be used, this with a simple circuit including only a power source and a suitable meter. However a circuit of the bridge type including a standard transducer and a test transducer, such as in FIGURE 4, has numerous advantages, the chief one of which is that it is self-compensating for a number of variable conditions which affect calibration of the device. For example, it compensates for decay of the radioactive material utilized, this assuming, of course, that the same radioactive material (of the same half-life) is used in the test transducer as in the standard transducer. It is also self-compensating for changes in temperature, humidity and the like which would otherwise affect the readings. Any changes in temperature, humidity or radioactivity affecting test transducer 70 affect standard transducer 72 substantially to the same extent, thus retaining the Wheatstone circuit in balance, though it is desirable, of course, to rebalance and calibrate the device at intervals to obtain optimum accuracy in the measurements or tests made.

In the above description, reference has been made to use of the device for measuring thicknesses, but the device may be used for numerous other types of tests and measurements, the following examples serving to illustrate:

For the nondestructive testing of solder bonds and joints as, for example, in vehicle radiator manufacture. The backscattering type transducer, such for example as is shown in FIGURES 1 and 2 or FIGURE 3, allows the test to be made completely externally of the radiator to one side of the solder joints and therefore without damage to the radiator. Any air pockets, pin holes, or porosity in the solder joints are immediately indicated by the device in that these defects affect the backscattering of radiation.

For measuring the thickness of solder coating on tubes. The radiation source and radiation-sensitive semi-conductor may be placed either on the same side of the tube wall or on opposite sides. The radiation source can be located, for example, on the inside of the tube and a ring of semi-conductors on the outside of the tube to indicate the average coating thickness on the tube.

To detect subsurface porosity in metal castings and the like, the theory of operation being much the same as above with respect to the testing of solder joints.

As an automatic counting device in manufacturing operations. Because of the low A.C. or D.C. voltage required to operate, and the small size which allows it to be placed in small areas, a device incorporating the invention provides an excellent means for counting passing objects as on a production line. An electrically actuated counter can be used in the circuit in place of or in addition to a meter.

As an indicator for the cleanness of crankcase oil in an automotive vehicle. Because of the very small size of the device which is enabled by the use of a semi-conductor as the radiation counter, an instrument incorporating the invention can be inserted, as by a filling station attendant, into a vehicle crankcase, an attached meter indicating whether the oil needs changing. Dirty oil has a different density than clean oil and thus has a different effect on the transmission and reflection of radiation than does clean oil. The invention could also be incorporated into the vehicle as a gauge for the same purpose.

To test batteries. Measurement of the density of the electrolyte in a wet cell battery, such as is used in automotive vehicles, is a measurement of the power output or remaining life of the battery. Thus, a gauge incorporating the present invention and appropriately calibrated can be inserted into the battery electrolyte and thereby indicate whether the battery is good or bad.

To test for the presence and amount of antifreeze in a vehicle radiator, the theory of operation here being the same as in testing batteries and oil.

Numerous other uses and embodiments will be apparent.

In some instances it may be desirable to utilize the same radiation source for the standard transducer as for the test transducer. For example, a single radiation source can be located in a fixture to project rays forward to a test specimen for backscattering to a radiation-sensitive semi-conductor, and backward to a standard specimen within the fixture for backscattering to a different radiation-sensitive semi-conductor. Also, while the backscatsemi-conductor are positioned adjacent each other in the same fixture constitutes the preferred embodiment of the invention, the semi-conductor may be located in a separate fixture positioned on the side of the body to be tested opposite from that where the radioactive material is located to thereby indicate the transmission of radiation through the test body. As indicated above in one of the examples of the uses of the invention, such an embodiment may serve to advantage in certain applications.

Various other changes and modifications may be made, all within the full and intended scope of the claims which follow.

We claim:

1. A measuring and testing device comprising a pair of substantially identical fixtures, each of said fixtures including: a block having a recess therein, a second block removably secured in said recess, said second block also having a recess therein, a beta radiation emitting radioactive material in said second mentioned recess, a beta radiation sensitive semi-conductor material secured to said first mentioned block and positioned to receive reflected beta radiation from said radioactive material, one of said materials being generally ring-shaped and closely surrounding the other of said materials, the walls of said first block and said second block serving as an annular radiation shield interposed between said radioactive material and said semi-conductor material to substantially block the passage of beta radiation from said radioactive material directly to said semi-conductor material, and a screen over said semi-conductor material to block light from said semi-conductor material while allowing the passage of said reflected beta radiation; said device also including a bridge-type circuit having two conjugate arms one of which conjugate arms includes the beta radiation-sensitive semi-conductor material in one of said fixtures and the other of which conjugate arms includes the beta radiation-sensitive material in the other of said fixtures, a source of electrical energy in said circuit for passing an electric current through each of said semi-conductor materials and means in said circuit to measure the difference in the conductivities of said semi-conductor materials, one of said fixtures being for the purpose of measuring a standard such that the semi-conductor material in said one fixture thereby provides a standard conductance in said circuit.

2. A measuring and testing device as set forth in claim 1 wherein the beta radiation-sensitive semi-conductor material is a cadmium sulfide crystal and wherein the beta emitting radiation source is arranged concentrically around the cadmium sulfide crystal.

3. A measuring and testing device as set forth in claim 1 wherein the radiation-sensitive semi-conductor material is in the form of a plurality of cadmium sulfide crystals concentrically surrounding the beta radiation emitting radiation source.

References Cited in the file of this patent

UNITED STATES PATENTS

| | | |
|---|---|---|
| Re. 22,531 | Hare | Aug. 22, 1944 |
| 2,629,831 | Atchley | Feb. 24, 1953 |
| 2,675,482 | Brunton | Apr. 13, 1954 |
| 2,706,790 | Jacobs | Apr. 19, 1955 |
| 2,769,097 | Lord | Oct. 30, 1956 |
| 2,774,887 | McMaster | Dec. 18, 1956 |
| 2,781,453 | Belcher et al. | Feb. 12, 1957 |
| 2,813,010 | Hutchins | Nov. 12, 1957 |
| 2,859,349 | Bradley et al. | Nov. 4, 1958 |

OTHER REFERENCES

The Photo-Conductivity of "Incomplete Phosphors" by Frerichs, in Physical Review, October 1947, vol. 72, No. 7, pp. 594–600.

An Economical Industrial X-ray Detector, by Frerichs and Jacobs, General Electric Review, pp. 42–45, August 1951.

Peaceful Uses of Atomic Energy, vol. 15, U.N. Publication, August 1955, pp. 119–134.